United States Patent
Choi et al.

(10) Patent No.: US 9,877,160 B2
(45) Date of Patent: Jan. 23, 2018

(54) OPERATING METHOD OF USER-SPECIFIC DEVICE PROVIDING CUSTOMIZED SERVICE TO MULTIPLE ADJACENT MOBILE TERMINALS, USER-SPECIFIC DEVICE, AND MOBILE TERMINAL

(71) Applicant: Samsung Electronics Co., Ltd., Suwon-si (KR)

(72) Inventors: Chang Mok Choi, Seoul (KR); Sang Joon Kim, Hwaseong-si (KR); Su-Hyun Na, Seoul (KR); Yu Jin Na, Seoul (KR); Jong Kee Lee, Seoul (KR); Soon Kyu Jang, Gwacheon-si (KR); Young Ei Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/189,257

(22) Filed: Jun. 22, 2016

(65) Prior Publication Data

US 2016/0295368 A1  Oct. 6, 2016

Related U.S. Application Data

(63) Continuation of application No. 14/482,558, filed on Sep. 10, 2014, now Pat. No. 9,386,418.

(30) Foreign Application Priority Data

Apr. 4, 2014 (KR) .......................... 10-2014-0040358

(51) Int. Cl.
*H04W 4/02* (2009.01)
*H04W 64/00* (2009.01)
*H04W 4/00* (2009.01)
*H04W 76/02* (2009.01)
*H04M 15/00* (2006.01)
*H04W 4/24* (2009.01)

(52) U.S. Cl.
CPC ....... *H04W 4/023* (2013.01); *H04M 15/8033* (2013.01); *H04M 15/8072* (2013.01); *H04W 4/008* (2013.01); *H04W 64/003* (2013.01); *H04W 76/02* (2013.01); *H04W 4/24* (2013.01)

(58) Field of Classification Search
CPC ....... H04W 4/008; H04W 4/023; H04W 4/24; H04W 64/003; H04W 76/02
USPC ......................................................... 455/406
See application file for complete search history.

(56) References Cited

U.S. PATENT DOCUMENTS

| 7,254,236 | B1 | 8/2007 | Eskicioglu et al. |
| 7,587,196 | B2 | 9/2009 | Hansen |
| 8,429,071 | B2 | 4/2013 | Davis et al. |

(Continued)

FOREIGN PATENT DOCUMENTS

| JP | 4023508 B2 | 12/2007 |
| JP | 4282882 B2 | 6/2009 |

(Continued)

*Primary Examiner* — Michael Neff
(74) *Attorney, Agent, or Firm* — NSIP Law

(57) ABSTRACT

A method and apparatus are configured to recognize mobile terminals positioned within a coverage area for short range communication with a user-specific device, wherein each mobile terminal comprises identification information for the user-specific device. The method and the apparatus provide a customized service corresponding to at least one of the mobile terminals.

20 Claims, 12 Drawing Sheets

(56) References Cited

U.S. PATENT DOCUMENTS

| | | | |
|---|---|---|---|
| 8,505,078 | B2 | 8/2013 | Hohlfeld et al. |
| 9,386,418 | B2 * | 7/2016 | Choi .................. H04W 4/023 |
| 2002/0028683 | A1 | 3/2002 | Banatre et al. |
| 2002/0120741 | A1 | 8/2002 | Webb et al. |
| 2010/0070760 | A1 | 3/2010 | Vanderveen et al. |
| 2010/0107225 | A1 | 4/2010 | Spencer et al. |
| 2011/0086611 | A1 | 4/2011 | Klein et al. |
| 2014/0287732 | A1 * | 9/2014 | Kannan .................. H04W 4/16 |
| | | | 455/417 |

FOREIGN PATENT DOCUMENTS

| | | |
|---|---|---|
| JP | 2012-512475 A | 5/2012 |
| JP | 5074596 B2 | 11/2012 |
| KR | 10-2005-0116812 A | 12/2005 |
| KR | 10-0922263 B1 | 10/2009 |
| KR | 10-1003095 B1 | 12/2010 |
| KR | 10-2011-0060574 A | 6/2011 |
| KR | 10-2011-0120651 A | 11/2011 |
| KR | 10-2013-0098780 A | 9/2013 |

* cited by examiner

OPERATING METHOD OF USER-SPECIFIC DEVICE PROVIDING CUSTOMIZED SERVICE TO MULTIPLE ADJACENT MOBILE TERMINALS, USER-SPECIFIC DEVICE, AND MOBILE TERMINAL

CROSS-REFERENCE TO RELATED APPLICATION

This application is a continuation of U.S. patent application Ser. No. 14/482,558 filed on Sep. 10, 2014, which claims the benefit under 35 USC 119(a) of Korean Patent Application No. 10-2014-0040358, filed on Apr. 4, 2014, in the Korean Intellectual Property Office, the entire disclosure of which is incorporated herein by reference for all purposes.

BACKGROUND

1. Field

The following description relates to a user-specific device, a mobile terminal, and an operating method of the user-specific device providing a customized service to adjacent mobile terminals.

2. Description of Related Art

Amid the proliferation of smart phones, a variety of mobile devices including wearable type mobile devices have been emerging, for example, a wearable smart devices or wearable portable media players.

A mobile device provides a great deal of convenience for modern life. A growing computing power of mobile devices enables users to complete tasks previously performed using a personal computer (PC).

The mobile device provides a variety of services by being paired with the wearable device performing a function of an "appcessory", which is derived from an amalgamation of application and accessory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method, including recognizing mobile terminals positioned within a coverage area for short range communication with a user-specific device, wherein each mobile terminal comprises identification information for the user-specific device; and providing a customized service corresponding to at least one of the mobile terminals.

The recognizing may include recognizing the mobile terminals positioned within the coverage area using the identification information.

The providing may include providing the customized service corresponding to the at least one mobile terminal based on a distance between the user-specific device and each mobile terminal.

The providing may further include providing the customized service to a mobile terminal positioned closest to the user-specific device.

In response to a single mobile terminal being recognized within the coverage area, the providing may further include providing the customized service corresponding to the single mobile terminal.

The providing may further include providing the customized service corresponding to the at least one mobile terminal based on a priority preassigned to each of the mobile terminals.

The priority may be editable information.

The providing may further include determining predefined terminal condition information of customized service available for the mobile terminals; and providing the customized service based on the terminal condition information.

The providing may further include determining terminal condition information of customized service available for the mobile terminals is absent; and transmitting an unavailable service message to the multiple mobile terminals.

The providing may further include receiving a billing rate for the customized service from the at least one mobile terminal; and calculating a fee to be paid based on the received billing rate.

The method may further include adjusting a billing rate of remaining mobile terminals among the mobile terminals based on the received billing rate.

In one general aspect, there is provided a non-transitory computer-readable storage medium comprising a program comprising instructions to cause a computer to perform the method as describe above.

In another general aspect, there is provided a mobile terminal, including a communication unit configured to perform short range communication with a user-specific device; and a processor configured to receive customized service from the user-specific device in response to being within a coverage area for the short range communication with the user-specific device.

The mobile terminal may include identification information for the user-specific device.

The user-specific device may be configured to recognize that the mobile terminal is positioned within the coverage area for the short range communication with the user-specific device based on the identification information.

The mobile terminal may be configured to receive the customized service corresponding to the mobile terminal from the user-specific device based on a distance from the user-specific device.

The mobile terminal may be configured to receive the customized service corresponding to the mobile terminal from the user-specific device based on a priority preassigned to the mobile terminal.

The priority may be editable information.

The mobile terminal may include a touch display configured to display a preset billing rate, wherein the processor is configured to receive a billing rate for the customized service based on a gesture of a user of the mobile terminal in response to the preset billing rate, and transmit the received billing rate to the user-specific device through the communication unit.

The billing rate for the customized service may be configured to increase, decrease, or be maintained based on the gesture of the user, and wherein the billing rate is displayed on the touch display.

In one general aspect, there may be provided a user-specific device, including a recognizer configured to recognize a mobile terminal positioned within a coverage area for short range communication with a user-specific device, wherein the mobile terminal comprises identification information for the user-specific device; and a provider configured to provide a customized service corresponding to the mobile terminal.

The user-specific device may be configured to recognize that the mobile terminal is positioned within the coverage area for the short range communication with the user-specific device based on the identification information.

The recognizer may read and process identification information associated with the mobile terminal to recognize the customized services desired by the mobile terminal.

The identification information may be pre-stored in the mobile terminal or in the user-specific device.

The user-specific device may provide the customized service corresponding to the mobile terminal based on a distance between the user-specific device and the mobile terminal, based on a priority of the mobile terminal with respect to priorities of other mobile terminals within the coverage area, or based on a location of the mobile terminal.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
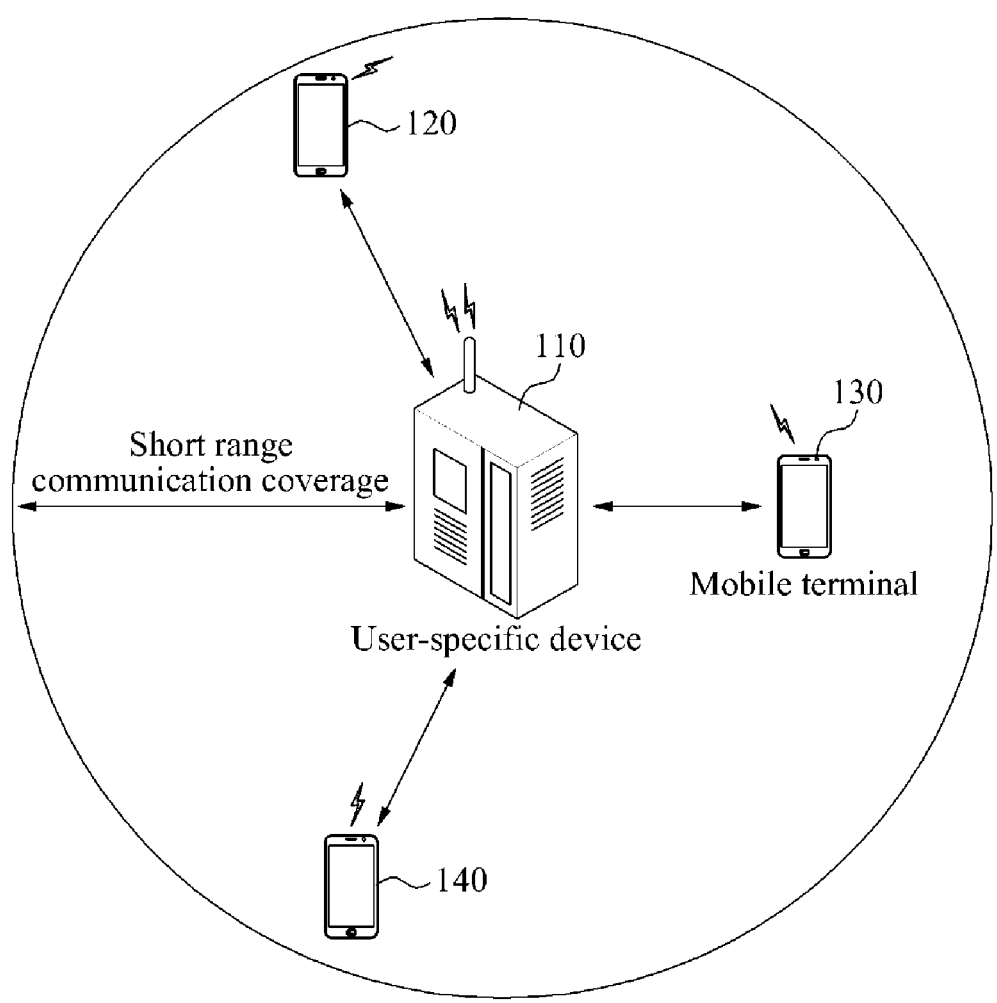
FIG. 1 is a diagram illustrating an example of an environment in which a user-specific device provides a customized service to multiple mobile terminals that are adjacent to the user-specific device, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of an environment in which a user-specific device 110 provides a customized service to multiple mobile terminals, for example, 120, 130, and 140, adjacent to the user-specific device 110, in accordance with an embodiment.

Referring to FIG. 1, the user-specific device 110 recognizes the multiple mobile terminals 120, 130, and 140 positioned within a coverage area thereof for short range communication.

The user-specific device 110 provides the customized service to at least one of the recognized multiple mobile terminals 120, 130, and 140. In one example, the customized service to be provided from the user-specific device 110 to the at least one mobile terminal is a service that has been modified to comply with specifications associated with a user of the at least one mobile terminal. The service customized of the mobile terminal is construed as a customized service for a user of the mobile terminal.

The mobile terminals 120, 130, and 140, each include identification information for the user-specific device 110. The identification information is mobile terminal identification information to be used to identify each mobile terminal 120, 130, and 140 at the user-specific device 110. The mobile terminal identification information identifies each of the multiple mobile terminals 120, 130, and 140 positioned within the coverage area to short range communicate with the user-specific device 110. The identification information is, in one example, numerical information associated with a mobile terminal, including, caller identification (CID), calling line identification (CLID), calling number delivery (CND), and calling line identification presentation (CLIP), identification information assigned to the mobile terminal at a manufacturing stage, or identification information temporarily or semipermanently assigned to the mobile terminal within the coverage area.

Examples of the customized service to be provided will be described hereinafter.

In an example, a vehicle equipped with the user-specific device 110 would detect a mobile terminal A associated with a user X. The user-specific device 110 would detect customized services desired by the user X from the mobile terminal A including, but not limited to, position of vehicle seats, position of mirrors, and the user X desired temperature within the vehicle.

The user-specific device 110 reads and processes identification information of the mobile terminal A to recognize the customized services desired by the user X. Thus, a seat position, a seat height, and angles of side-view mirrors and a rear-view mirror may be automatically adjusted based on information related to the identification information included in the mobile terminal A. The information related to the identification information associated with the mobile terminal A may include the seat position, the seat height, and the angles of the side-view mirrors and the rear-view mirror suitable for the user X.

The information related to the identification information associated with the mobile terminal A may be pre-stored in the mobile terminal A or the user-specific device 110 based on the identification information of the mobile terminal A.

In another example, a computer in the vehicle recognizes the mobile terminal A of the user X and provides a customized service for the user X.

In one illustrative example, the user-specific device 110 is embedded in the computer, and the user X possessing the mobile terminal A approaches the computer. The user-specific device 110 would then recognize the mobile terminal A to provide the customized service for the user X. In one example, the customized service for the mobile terminal A is an automatic login service and a wallpaper setting service related to the computer for the user X.

The computer recognizes the mobile terminal A, within the coverage area for short range communication, based on the identification information associated with the mobile terminal A. The computer provides the automatic login service and the wallpaper setting service as a customized service for the mobile terminal A. The automatic login service and the wallpaper setting service are based on information related to the identification information associated with the mobile terminal A of the user X.

The information related to the identification information includes, for example, an ID and a password as the automatic login service, and information on brightness, saturation value, font size, and color arrangement as the wallpaper setting service. The information related to the identification information associated with the mobile terminal A may be prestored in the mobile terminal A or the user-specific device 110.

In still another example, a point of sale (PoS) terminal may recognize the mobile terminal A of the user X and provide a customized service for the user X. In this example, the user-specific device 110 is embedded in the PoS terminal, and the user X possessing the mobile terminal A approaches the PoS terminal. The customized service for the mobile terminal A may be an automatic billing service or an installment billing service of the PoS terminal.

The PoS terminal recognizes the mobile terminal A within the coverage area of short range communication based on the identification information associated with the mobile terminal A. The PoS terminal provides the automatic billing service or the installment billing service as the customized service for the mobile terminal A. The automatic billing service and the installment billing service are based on information related to the identification information associated with the mobile terminal A.

The user-specific device 110 is provided as a separate device or in a form of hardware integrated within a device.

The mobile terminals 120, 130, and 140 may be smartphones or communication devices having a similar function to smartphones.

In one illustrative example, the user-specific device 110 provides a customized service to a mobile terminal positioned closest to the user-specific device 110 among the mobile terminals 120, 130, and 140. Alternatively, the user-specific device 110 provides a customized service to a mobile terminal having a higher priority among the mobile terminals 120, 130, and 140 based on a pre-assigned priority. The pre-assigned priority may be editable information. For example, in a scenario in which the vehicle driver and vehicle passenger each has a mobile terminal, the user-specific device 110 may be configured to provide the customized service to the mobile terminal of the vehicle driver based on either a pre-assigned priority.

In another example, the user-specific device 110 provides a customized service not only for a mobile terminal but also for a wearable device paired with the mobile terminal. For example, a wearable device W may be paired with the mobile terminal A. The user-specific device 110 recognizes the wearable device W based on identification information associated with the wearable device W paired with the mobile terminal A. In one configuration, the identification information associated with the wearable device W is identical to or different from the identification information associated with the mobile terminal A.

When the identification information associated with the wearable device W is identical to the identification information associated with the mobile terminal A, the user-specific device 110 provides, to a user wearing the wearable device W, a variety of customized services corresponding to the mobile terminal A.

Conversely, when the identification information associated with the wearable device W differs from the identification information associated with the mobile terminal A, the user-specific device 110 provides, to the user wearing the wearable device W, a customized service corresponding to the wearable device W.

A method of providing a customized service performed between a user-specific device and a mobile terminal, which will be described hereinafter, may be also applied to a wearable device.

The wearable device may be attachable to, wearable on, or detachable from a portion of a body using an arm band, a wrist band, or other fixing elements.

Figure 2:
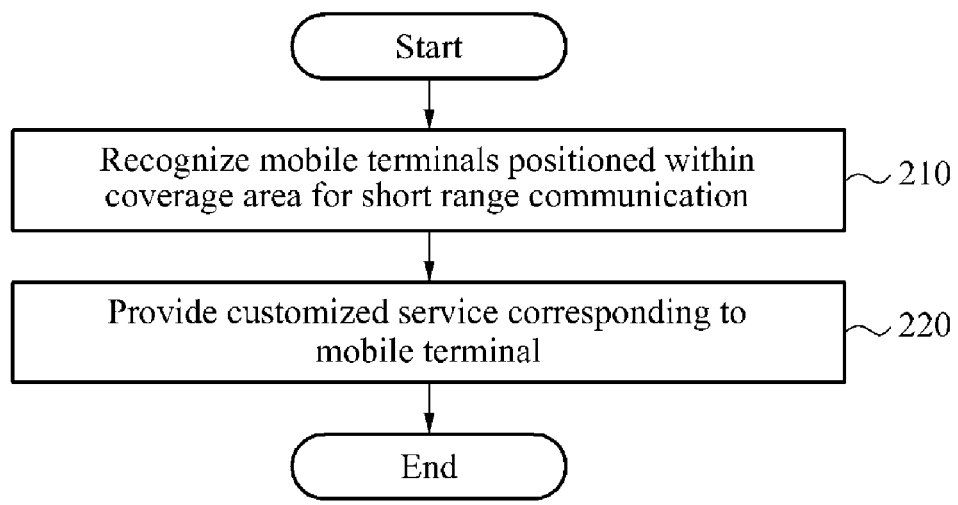
FIG. 2 is a flowchart illustrating an example of an operating method of a user-specific device, in accordance with an embodiment.

FIG. 2 is a flowchart illustrating an example of an operating method of a user-specific device, in accordance with an embodiment.

Referring to FIG. 2, at operation 210, the method recognizes, at the user-specific device, multiple mobile terminals positioned within a coverage area for short range communication with the user-specific device. Each mobile terminal may include identification information for the user-specific device. At operation 210, the method recognizes the mobile terminals positioned within the coverage area using the identification information.

At operation 220, the method, through the user-specific device, provides to at least one of the mobile terminals recognized in operation 210, a customized service corresponding to the at least one mobile terminal. The method provides a customized service to either a number of the recognized mobile terminals or to all the recognized mobile terminals.

Figure 3:
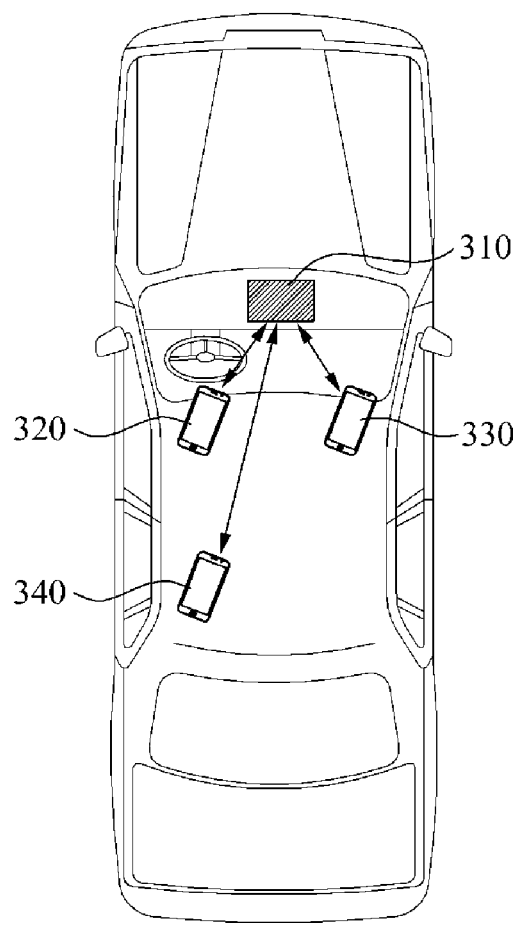
FIG. 3 is a diagram illustrating an example of a method providing a customized service by a vehicle including a user-specific device, in accordance with an embodiment.

FIG. 3 is a diagram illustrating an example of a method to provide a customized service through a vehicle including a user-specific device 310, in accordance with an embodiment.

FIG. 3 illustrates an example situation in which a user with a mobile terminal 320 is seated at a driver seat, another user with a mobile terminal 330 is seated at a front passenger seat, and still another user with a mobile terminal 340 is seated in a back seat of the vehicle including the user-specific device 310. In this example, the user-specific device 310 is positioned in front of the driver seat or in the vicinity of a vehicular navigation system. However, a person of ordinary skill in the relevant art will appreciate that the user-specific device 310 may be located in alternative location within the vehicle, such as the vehicle trunk, a side door panel, vehicle ceiling, underneath a vehicle seat, or vehicle bed (supporting the seats).

The user-specific device 310 detects, recognizes, and identifies the mobile terminals 320, 330, and 340 within a coverage area for short range communication.

The user-specific device 310 provides a customized service corresponding to at least one of the mobile terminals 320, 330, and 340 based on a distance between the user-specific device 310 and each recognized mobile terminal. The distance may be construed as a physical distance or a communication distance. The user-specific device 310 provides a customized service corresponding to a mobile terminal based on various physical parameters such as communication power in addition to the distance.

The user-specific device 310 provides a customized service corresponding to the mobile terminal 320 to the mobile terminal 320 positioned closest to the user-specific device 310 among the mobile terminals 320, 330, and 340. The customized service corresponding to the mobile terminal 320 is a customized service for the user of the mobile terminal 320.

Based on the information either pre-stored in the user specific device 310 or on the information stored in the mobile terminal 320, the user-specific device 310 automatically adjusts a seat position, a seat height, and angles of side-view mirrors and a rear-view mirror for the user of the mobile terminal 320. In this example, the seat position, the seat height, and the angles of the side-view mirrors and the rear-view mirror, suitable for the user of the mobile terminal 320, is stored as the identification information associated with the mobile terminal 320 for the user-specific device 310. In another illustrative example in which the identification information is stored in both the user-specific device 310 and the mobile terminal 320, the user-specific device 310 may be pre-configured to take on priority when the identification information stored is different from the information stored in the mobile terminal 320. In the alternative, the user-specific device 310 may be pre-configured to provide deference to the identification information stored in the mobile terminal 320 when the information stored in the user-specific device 310 is different from the information stored in the mobile terminal 320. In this last alternative example, the seat position, the seat height, and the angles of the side-view mirrors and the rear-view mirror would be adjusted based on the identification information stored in the mobile terminal 320.

The seat position, the seat height, and the angles of the side-view mirrors and the rear-view mirror, suitable for the user of the mobile terminal 320, are pre-stored in the user-specific device 310 as the identification information associated with the mobile terminal 320.

The user-specific device 310 may also provide the customized service corresponding to the mobile terminal 340 positioned farthest from the user-specific device 310 or the mobile terminal 330 positioned amongst the user-specific device 310 and the mobile terminals 320, 330, and 340.

Figure 4:
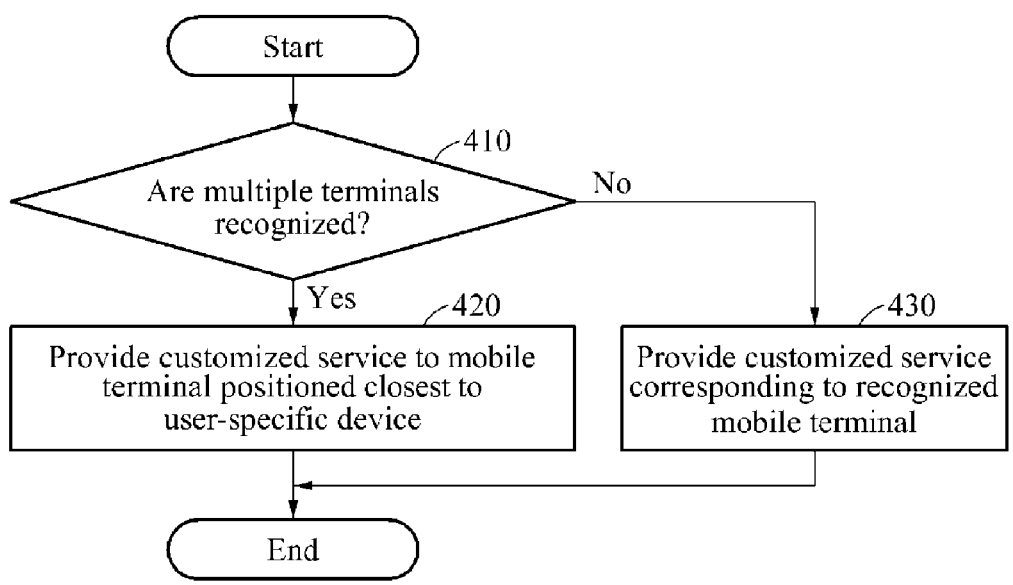
FIG. 4 is a flowchart illustrating another example of an operating method of a user-specific device, in accordance with an embodiment.

FIG. 4 is a flowchart illustrating another example of an operating method of a user-specific device, in accordance with an embodiment.

Referring to FIG. 4, at operation 410, the method determines, through the user-specific device, whether multiple mobile terminals are recognized within a coverage area for short range communication.

At operation 420, when the multiple mobile terminals are recognized within the coverage area for the short range communication, the method, through the user-specific device, provides a customized service to a mobile terminal positioned closest to the user-specific device or with a highest priority set among the mobile terminals.

At operation 430, when a single mobile terminal is recognized within the coverage area for the short range communication, the method, through the user-specific device, provides a customized service corresponding to the recognized single mobile terminal.

Figure 5:
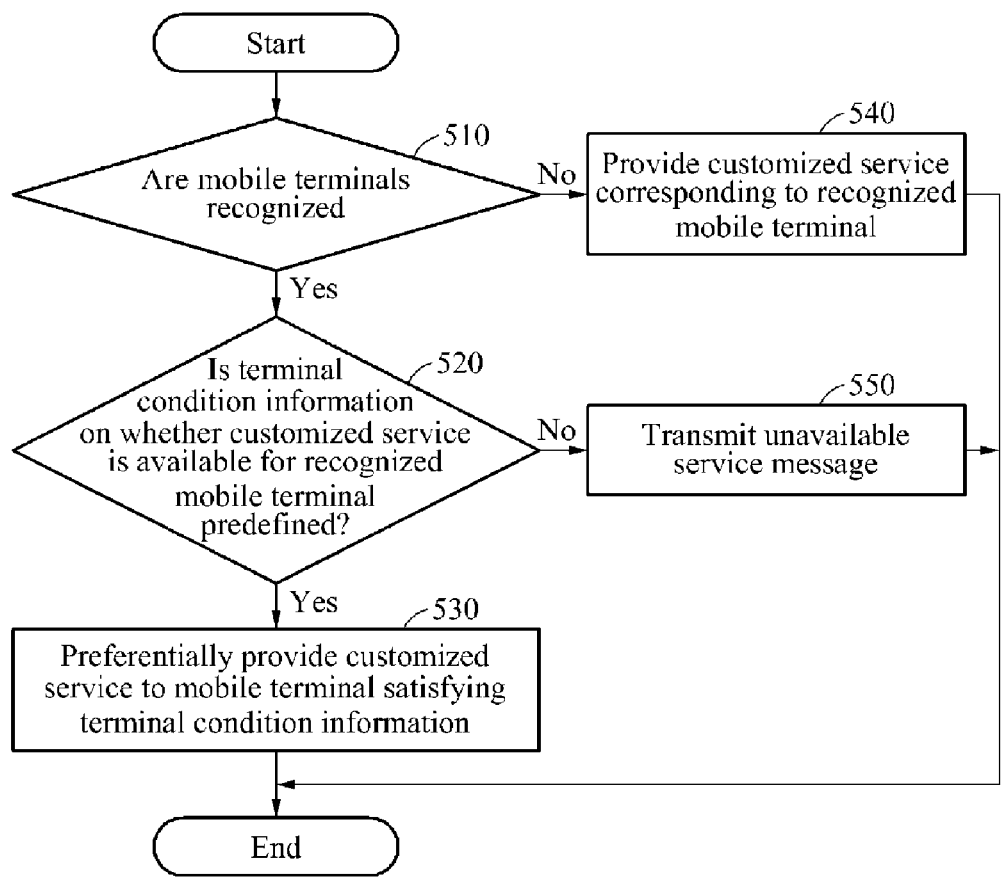
FIG. 5 is a flowchart illustrating still another example of an operating method of a user-specific device, in accordance with an embodiment.

FIG. 5 is a flowchart illustrating still another example of an operating method of a user-specific device, in accordance with an embodiment.

At operation 510, the method, through the user-specific device, determines whether multiple mobile terminals are recognized within a coverage area for short range communication.

At operation 540, when a single mobile terminal is recognized within the coverage area for the short range communication, the method, through the user-specific device, provides a customized service corresponding to the recognized single mobile terminal.

At operation 520, when the multiple mobile terminals are recognized within the coverage area for the short range communication, the method, through the user-specific device, determines whether terminal condition information on whether the customized service for a recognized mobile terminal is predefined. The terminal condition information is information defining conditions of a mobile terminal that are selected to preferentially receive a customized service among the recognized mobile terminals.

The method provides a customized service based on a result of the determining at operation 520.

At operation 530, when the terminal condition information is predefined, the method, through the user-specific device, provides a customized service to a mobile terminal that satisfies the terminal condition information among the mobile terminals. For example, when a priority preassigned to each mobile terminal is preset, a mobile terminal satisfying the terminal condition information is granted a highest priority. The user-specific device provides the customized service to a mobile terminal with a highest priority among the mobile terminals.

At operation 550, when the terminal condition information is not predefined, the method, through the user-specific device, transmits an unavailable service message to the mobile terminals. The unavailable service message is a message indicating that a customized service may not be provided to a user because multiple users are recognized within the coverage area for the short range communication.

For example, when mobile terminals A and B are recognized within the coverage area for the short range communication, but none of the mobile terminals A and B includes a predefined condition to which the customized service is to be preferentially provided, the method directs the user-specific device to transmit a message to the mobile terminals A and B providing notification that the customized service may not be provided.

Figure 6:
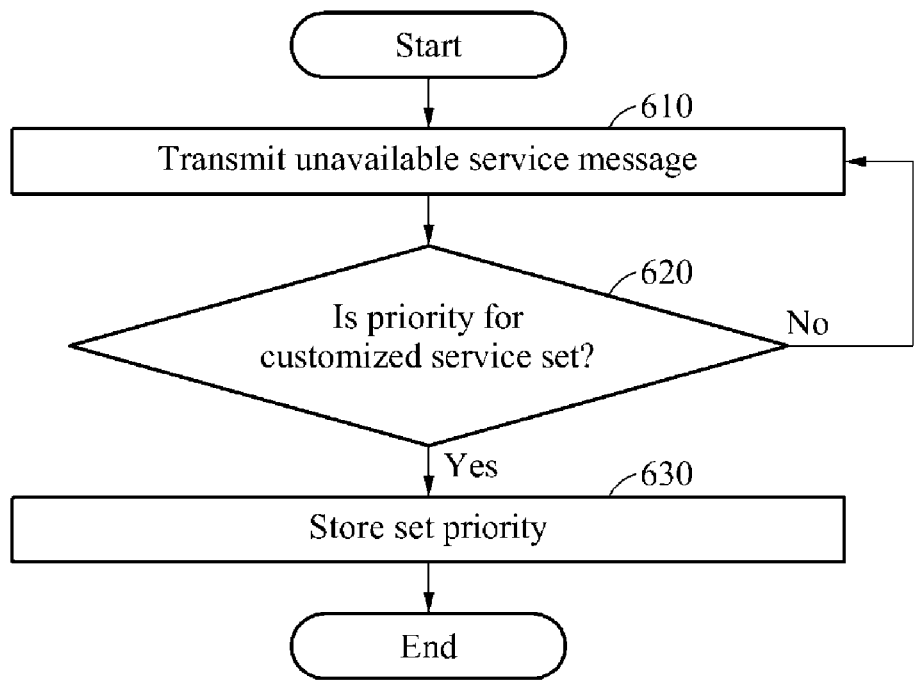
FIG. 6 is a flowchart illustrating an example of a method setting a priority for a customized service in a user-specific device, in accordance with an embodiment.

FIG. 6 is a flowchart illustrating an example of a method of setting a priority for a customized service in a user-specific device, in accordance with an embodiment.

FIG. 6 illustrates an example of a method receiving an input of priority setting by a user when a customized service is not available because multiple users A and B are recognized.

Referring to FIG. 6, at operation 610, when terminal condition information is not predefined although the multiple users A and B are recognized, the method, through the user-specific device, transmits an unavailable service message to multiple mobile terminals.

Figure 7:
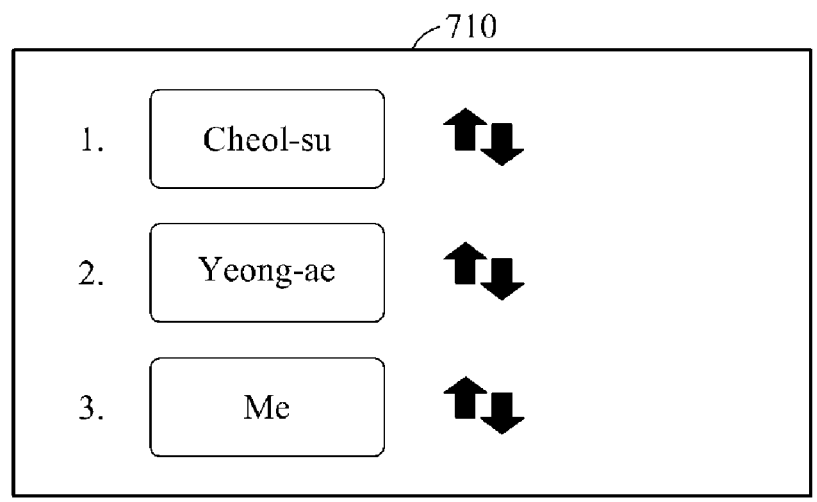
FIG. 7 is a diagram illustrating an example of for a display of a customized service in a user-specific device, in accordance with an embodiment.

For example, as illustrated in FIG. 7, the user-specific device displays names of users of mobile terminals to which a customized service is to be provided and receives the input of a priority setting with respect to the users whose names are displayed for the customized service.

At operation 620, the method, through the user-specific device, determines whether the priority setting with respect to the users for the customized service is input.

When the priority setting with respect to the users is not input, the method, through the user-specific device, returns to operation 610 and transmits the unavailable service message to the mobile terminals.

At operation 630, when the priority setting with respect to the users is input as the result of the determining in 620, the method, through the user-specific device, stores the set priority. For example, the user-specific device may edit the priority stored in operation 630.

FIG. 7 is a diagram illustrating a display of a priority for a customized service in a user-specific device, in accord with an embodiment.

FIG. 7 illustrates a display 710 of the user-specific device showing names of users, for example, Cheol-su, Yeong-ae, and Me, of mobile terminals to which a customized service may be provided.

Referring to FIG. 7, the user-specific device displays on the display 710 the names of the users of the mobile terminals to which the customized service is to be provided. The user of the user-specific device displays on the display unit 710 an input of a priority setting of the names.

For example, the user of the user-specific device sets a priority of "Me" to be first by moving "Me" up from a third row to a first row on the display 710 through a dragging action. The user of the user-specific device assigns a highest priority to "Me" through the dragging action. The display 710 may be a touch display or a display device having a function similar to the touch display.

In an example, an upward pointing arrow and a downward pointing arrow is displayed next to each user name, for example, Cheol-su, Yeong-ae, and Me, on the display 710. The user of the user-specific device adjusts a priority of each user by touching one of the arrows next to each user name.

Figure 8:
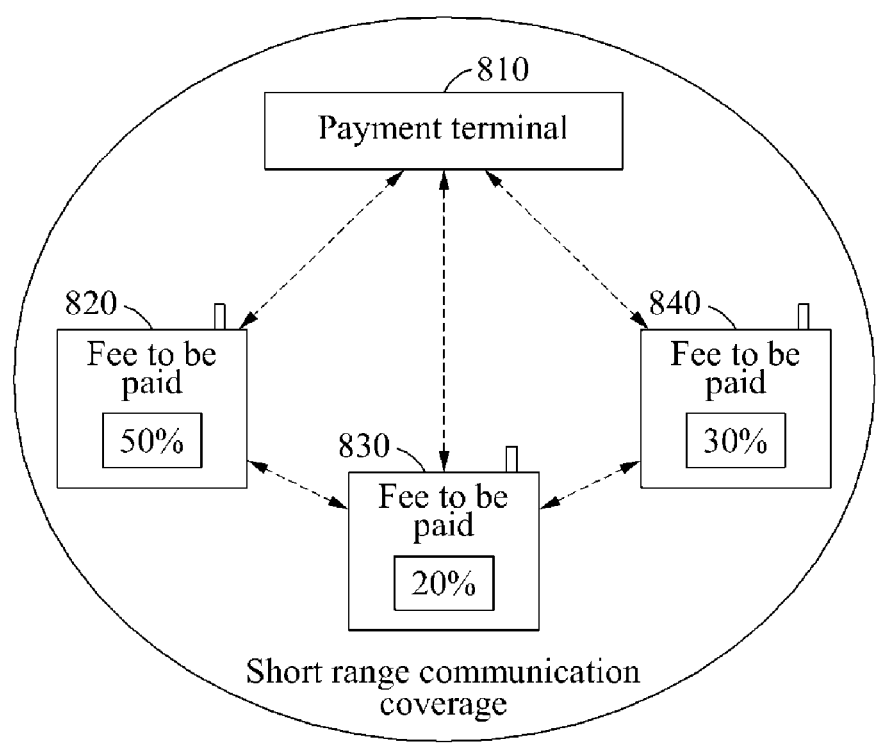
FIG. 8 is a diagram illustrating an example of a method adjusting a billing rate for a customized service in a user-specific device, in accordance with an embodiment.

FIG. 8 is a diagram illustrating an example of a method of adjusting a billing rate for a customized service in a user-specific device, in accordance with an embodiment.

Referring to FIG. 8, a mobile terminal 820, a mobile terminal 830, and a mobile terminal 840 are within a coverage area for short range communication with a user-specific device integrated with a payment terminal 810. The payment terminal 810 may be, for example, a PoS terminal. Users of the mobile terminals 820, 830, and 840 allow the mobile terminals 820, 830, and 840 to pay a bill by placing the mobile terminals 820, 830, and 840 close to the PoS terminal.

The payment terminal 810 receives a billing rate for a customized service from at least one of the mobile terminals 820, 830, and 840, and calculates a fee to be paid based on the received billing rate.

For example, when an amount to be paid to the payment terminal 810 is 100,000 Korean Won (KRW), the payment terminal 810 receives a billing rate of 50% from the mobile terminal 820, a billing rate of 20% from the mobile terminal 830, and a billing rate of 30% from the mobile terminal 840.

When the payment terminal 810 receives the billing rate of 50% from the mobile terminal 820 for the customized service, for example, a partial billing service, the payment terminal 810 calculates the fee to be paid to be 50,000 KRW based on the billing rate of 50% received from the mobile terminal 820. The payment terminal 810 calculates the fee to be paid to be 20,000 KRW based on the billing rate of 20% received from the mobile terminal 830. Similarly, the payment terminal 810 calculates the fee to be paid to be 30,000 KRW based on the billing rate of 30% received from the mobile terminal 840. The fees calculated by the payment terminal 810 for each mobile terminal may be automatically settled by the respective mobile terminals.

The payment terminal 810 also adjusts billing rates of remaining mobile terminals aside from the mobile terminal 820, for example, the mobile terminals 830 and 840, based on the billing rate of 50% received from the mobile terminal 820. When the billing rate of 50% is received from the mobile terminal 820, and the remaining billing rates are yet to be received from the mobile terminals 830 and 840, the payment terminal 810 equally adjusts the billing rates of the mobile terminals 830 and 840.

The user-specific device pays a bill by calculating the fees to be paid to be different based on the adjusted billing rates of the mobile terminals 830 and 840. When a billing rate of one of the mobile terminals 830 and 840 is adjusted, a billing rate of the other one of the mobile terminals 830 and 840 is automatically adjusted to make a total sum of all the billing rates equal to 100%.

For another example, at least two users pays a bill by simultaneously placing mobile terminals close to the payment terminal 810.

In one example, when terminal condition information, for example, a priority, that enables a mobile terminal to preferentially pay a bill is not defined, the payment terminal 810 transmits an unavailable service message to the mobile terminals.

The payment terminal 810 allows a mobile terminal to preferentially pay the bill by preassigning a priority to the mobile terminal. Alternatively, when multiple mobile terminals, for example, N mobile terminals, simultaneously approach the payment terminal 810, billing rates of the N mobile terminals may be identically set to allow each mobile terminal to pay an equal amount, for example, 1/N.

Figure 9:
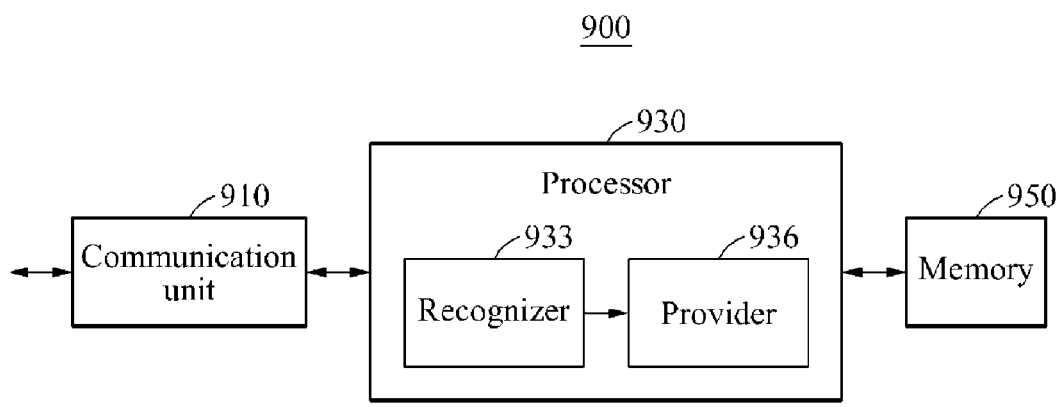
FIG. 9 is a block diagram illustrating an example of a user-specific device, in accordance with an embodiment.

FIG. 9 is a block diagram illustrating an example of a user-specific device 900, in accordance with an embodiment.

Referring to FIG. 9, the user-specific device 900 includes a communication unit 910, a processor 930, and a memory 950. Also, the user-specific device 900 may further include a touch display (not shown).

The communication unit 910 communicates with multiple mobile terminals positioned within a coverage area for short range communication with the user-specific device 900.

The processor 930 provides a customized service to at least one of the multiple mobile terminals positioned within the coverage area for the short range communication with the user-specific device 900.

The processor 930 includes a recognizer 933 and a provider 936.

The recognizer 933 recognizes the multiple mobile terminals positioned within the coverage area for the short range communication with the user-specific device 900.

The provider 936 provides, to the at least one mobile terminal, the customized service corresponding to the at least one mobile terminal of the multiple mobile terminals recognized by the recognizer 933.

The memory 950 stores information used for providing a customized service corresponding to a mobile terminal and a preset priority of each mobile terminal.

The touch display displays names of users of mobile terminals to which the customized service is to be provided, and receives inputs to select and delete the displayed names or change the priority of each mobile terminal by a touching or a dragging action by a user of the user-specific device 900.

Figure 10:
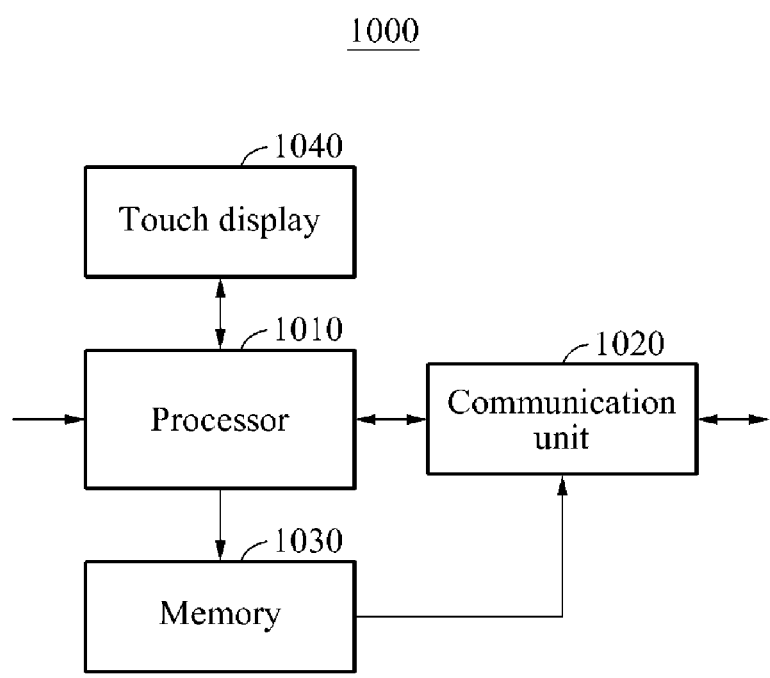
FIG. 10 is a block diagram illustrating an example of a mobile terminal, in accordance with an embodiment.

FIG. 10 is a block diagram illustrating an example of a mobile terminal 1000, in accordance with an embodiment.

Referring to FIG. 10, the mobile terminal 1000 includes a processor 1010, a communication unit 1020, and a memory 1030. The mobile terminal 1000 further includes a touch display 1040.

When the mobile terminal 1000 is recognized within a coverage area for short range communication with a user-specific device, the processor 1010 executes an application for a customized service corresponding to the mobile terminal 1000 to be provided by the user-specific device.

The communication unit 1020 performs the short range communication with the user-specific device.

The memory 1030 stores the application for the customized service. The mobile terminal 1000 includes identification information for the user-specific device. The identification information is stored in the memory 1030.

The user-specific device recognizes the mobile terminal 1000 positioned within the coverage area for the short range communication with the user-specific device based on the identification information.

The mobile terminal 1000 receives the customized service corresponding to the mobile terminal 1000 from the user-specific device based on a distance from the user-specific device. Alternatively, the mobile terminal 1000 receives the customized service corresponding to the mobile terminal 1000 from the user-specific device based on a priority preassigned to the mobile terminal 1000. The priority may be editable information.

The touch display 1040 displays a preset billing rate and the preassigned priority.

The processor 1010 receives a billing rate for the customized service based on a gesture of the user of the mobile terminal 1000 in response to the preset billing rate displayed on the touch display 1040. The processor 1010 transmits, through the communication unit 1020, the billing rate received based on the gesture of the user to the user-specific device.

The gesture of the user includes a touch or a drag input by the user in response to the preset billing rate displayed on the touch display 1040. In one example, the billing rate for the customized service increases, decreases, or maintains depending on the gesture of the user, and is visually provided on the touch display 1040.

A method of adjusting a billing rate for a customized service based on a gesture of a user in a mobile terminal will be further described with reference to FIGS. 11 and 12.

Figure 11:
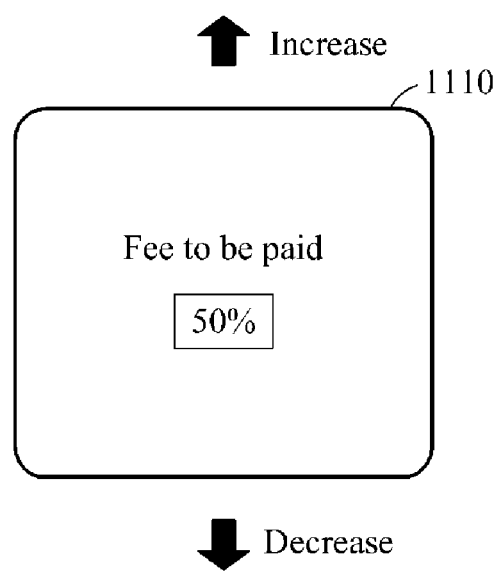
FIG. 11 is a diagram illustrating an example of a method of adjusting a billing rate for a customized service based on a gesture of a user in a mobile terminal, in accordance with an embodiment.

FIG. 11 is a diagram illustrating an example of a method of adjusting a billing rate for a customized service based on a gesture of a user in a mobile terminal, in accordance with an embodiment.

FIG. 11 illustrates a display 1110 of the mobile terminal. Referring to FIG. 11, the display 1110 indicates the billing rate for the customized service.

The mobile terminal inputs and adjusts the billing rate for the customized service based on the gesture of the user of the mobile terminal. For example, a preset billing rate for the customized service is indicated as 50% on the display 1110 of the mobile terminal.

In one example, the user of the mobile terminal moves back and forth.

The mobile terminal adjusts the billing rate based on the gesture of the user moving the terminal back and forth.

The mobile terminal adjusts the billing rate based on a direction of the movement. In response to the user moving the mobile terminal forward, the billing rate increases. In response to the user moving the mobile terminal backward, the billing rate decreases. The mobile terminal adjusts the billing rate using a signal sensed by, for example, an accelerometer, or an acceleration sensor, while the user is moving the terminal forward or backward.

The billing rate being increased, decreased, or be maintained based on the gesture of the user may be visually provided on the display 1110.

Figure 12:
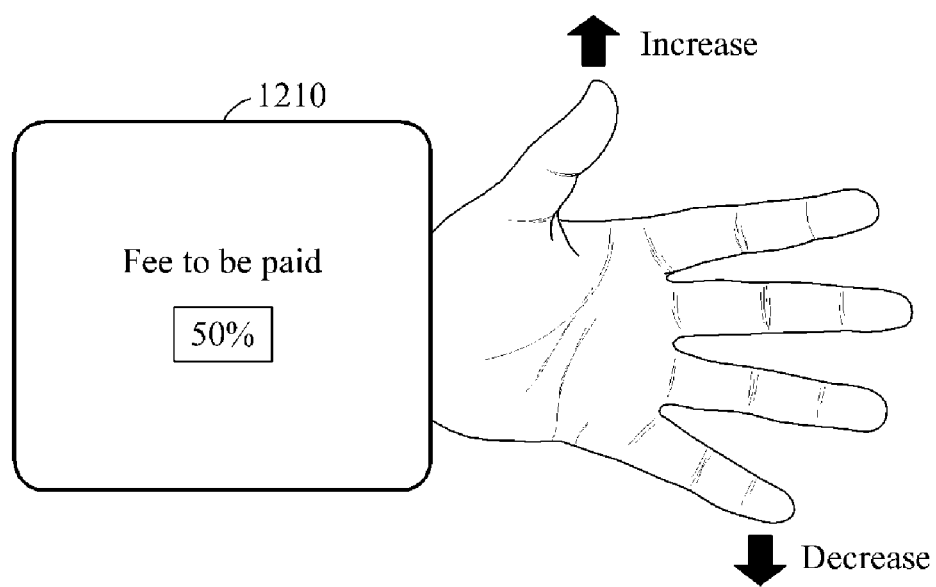
FIG. 12 is a diagram illustrating another example of a method of adjusting a billing rate for a customized service based on a gesture of a user in a mobile terminal, in accordance with an embodiment.

FIG. 12 is a diagram illustrating another example of a method of adjusting a billing rate for a customized service based on a gesture of a user in a mobile terminal, in accordance with an embodiment.

FIG. 12 illustrates a display 1210 of the mobile terminal. The display 1210 displays the billing rate for the customized service.

The mobile terminal inputs or adjusts the billing rate for the customized service based on the gesture of the user of the mobile terminal. For example, a preset billing rate for the customized service is indicated as 50% on the display 1210 of the mobile terminal.

In one illustrative example, the user of the mobile terminal moves a thumb or a little finger. The mobile terminal adjusts the billing rate based on the gesture of the user moving the thumb or the little finger. The mobile terminal adjusts the billing rate using a signal sensed by an electromyogram (EMG) sensor while the user is moving the fingers. The signal sensed by the EMG sensor may be an EMG signal generated before and after a muscular movement caused by the gesture of the user.

The mobile terminal increases the billing rate when the user moves the thumb, and decreases the billing rate when the user moves the little finger. The billing rate increased, decreased, or be maintained based on the gesture of the user is displayed on the display 1210.

The recognizer, the provider, and the units described herein may be implemented using hardware components. For example, the hardware components may include controllers, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIG. 7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 7.

Program instructions to perform a method described in FIG. 7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

As a non-exhaustive illustration only, a mobile terminal or a mobile device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

It is to be understood that in the embodiment of the present invention, the operations in FIGS. 2-6 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 2-6.

Program instructions to perform a method described in FIGS. 2-6, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, comprising:
 recognizing mobile terminals positioned within a coverage area for short range communication with a user-specific device based on identification information of each mobile terminal of the mobile terminals;
 determining a priority of each mobile terminal among the mobile terminals,
 wherein the priority of a respective mobile terminal corresponds to a distance between the user-specific device and the respective mobile terminal;
 selecting at least one mobile terminal among the recognized mobile terminals based on the identification information and the priority of the at least one mobile terminal; and
 providing a customized service corresponding to the at least one selected mobile terminal based on the distance between the user-specific device and each mobile terminal.

2. The method of claim 1, wherein the providing further comprises:
 providing the customized service to a mobile terminal positioned closest to the user-specific device.

3. The method of claim 1, wherein the priority is editable information.

4. The method of claim 1, wherein the providing further comprises:
determining predefined terminal condition information of the customized service; and
providing the customized service based on the terminal condition information.

5. The method of claim 1, wherein the providing further comprises:
determining that terminal condition information of a customized service available for the mobile terminals is absent; and
transmitting an unavailable service message to the multiple mobile terminals.

6. The method of claim 1, wherein the providing further comprises:
receiving a billing rate for the customized service from the at least one mobile terminal; and
calculating a fee to be paid based on the received billing rate.

7. The method of claim 6, further comprising:
adjusting a billing rate of remaining mobile terminals among the mobile terminals based on the received billing rate.

8. A non-transitory computer-readable storage medium comprising a program comprising instructions to cause a computer to perform the method of claim 1.

9. The method of claim 1, wherein first identification information of a first mobile terminal among the mobile terminals is stored in both the user-specific device and the first mobile terminal.

10. The method of claim 9, wherein, when the first identification information stored in the first mobile terminal is different from the first identification information stored in the user-specific device, the first identification information stored in the first mobile terminal is configured to take precedence over the first identification information stored in the user-specific device.

11. The method of claim 1, wherein, if the priority of each mobile terminal among the mobile terminals is not determined, transmitting an unavailable service message to the mobile terminals, wherein the unavailable service message prompts a user to input the priority of each mobile terminal.

12. A mobile terminal, comprising:
a communication unit configured to perform short range communication with a user-specific device;
a memory configured to store identification information for the user-specific device and a priority corresponding to a distance from the user-specific device; and
a processor configured to
receive customized service from the user-specific device in response to being within a coverage area for the short range communication with the user-specific device, and
in response to being selected by the user-specific device from among a plurality of mobile terminals based on the stored identification information and priority, to receive the customized service based on the distance from the user-specific device.

13. The mobile terminal of claim 12, wherein the user-specific device is configured to recognize that the mobile terminal is positioned within the coverage area for the short range communication with the user-specific device based on the identification information.

14. The mobile terminal of claim 12, wherein the priority is editable information.

15. The mobile terminal of claim 12, further comprising:
a touch display configured to display a preset billing rate,
wherein the processor is configured to receive a billing rate for the customized service based on a gesture of a user of the mobile terminal in response to the preset billing rate, and transmit the received billing rate to the user-specific device through the communication unit.

16. The mobile terminal of claim 15, wherein the billing rate for the customized service is configured to increase, decrease, or be maintained based on the gesture of the user, and
wherein the billing rate is displayed on the touch display.

17. A user-specific device, comprising:
a recognizer configured to
recognize mobile terminals positioned within a coverage area for short range communication with the user-specific device based on identification information of each mobile terminal of the mobile terminals; and
determine a priority of each mobile terminal among the mobile terminals,
wherein the priority of a respective mobile terminal corresponds to a distance between the user-specific device and the respective mobile terminal;
a selector configured to select at least one mobile terminal from the recognized mobile terminals based on the identification information and the priority of the at least one mobile terminal; and
a provider configured to provide a customized service corresponding to the mobile terminal based on the distance between the user-specific device and each mobile terminal.

18. The user-specific device of claim 17, wherein the user-specific device is configured to recognize that the at least one mobile terminal is positioned within the coverage area for the short range communication with the user-specific device based on the identification information of the at least one mobile terminal.

19. The user-specific device of claim 17, wherein the recognizer reads and processes the identification information of the at least one mobile terminal to recognize the customized service desired by the at least one mobile terminal.

20. The user-specific device of claim 17, wherein the identification information is pre-stored in the at least one mobile terminal or in the user-specific device.

* * * * *